US009928080B2

(12) United States Patent
Boenisch et al.

(10) Patent No.: US 9,928,080 B2
(45) Date of Patent: *Mar. 27, 2018

(54) HARDWARE SECURITY MODULE ACCESS MANAGEMENT IN A CLOUD COMPUTING ENVIRONMENT

(71) Applicant: International Business Machines Corporation, Armonk, NY (US)

(72) Inventors: Volker M. M. Boenisch, Boeblingen (DE); Reinhard Buendgen, Tuebingen (DE); Franziska Geisert, Altdorf (DE); Jakob C. Lang, Altdorf (DE); Mareike Lattermann, Stuttgart (DE); Angel Nunez Mencias, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 578 days.

This patent is subject to a terminal disclaimer.

(21) Appl. No.: 14/501,238

(22) Filed: Sep. 30, 2014

(65) Prior Publication Data

US 2016/0092687 A1    Mar. 31, 2016

(51) Int. Cl.
*G06F 1/26* (2006.01)
*G06F 9/44* (2018.01)
(Continued)

(52) U.S. Cl.
CPC ........ *G06F 9/4408* (2013.01); *G06F 9/45558* (2013.01); *G06F 21/572* (2013.01); *G06F 21/575* (2013.01); *G06F 2009/45587* (2013.01)

(58) Field of Classification Search
CPC .... G06F 21/575; G06F 21/572; G06F 9/4408; G06F 9/4416; G06F 9/45558; G06F 2009/45587
(Continued)

(56) References Cited

U.S. PATENT DOCUMENTS 7,565,553 B2 * 7/2009 Hunter ............... G06F 21/78
713/192
7,584,347 B2 * 9/2009 El-Haj-mahmoud . G06F 9/4408
713/1
(Continued)

FOREIGN PATENT DOCUMENTS

| CA | 2576630 C | 10/2011 |
|---|---|---|
| WO | 2011116459 A1 | 9/2011 |
| WO | 2016099644 A1 | 6/2016 |

OTHER PUBLICATIONS

Boenisch et al., "Hardware Security Module Access Management in a Cloud Computing Environment," U.S. Appl. No. 14/574,728, filed Dec. 19, 2014.
(Continued)

*Primary Examiner* — Samson Lemma
(74) *Attorney, Agent, or Firm* — Nicholas D. Bowman

(57) ABSTRACT

Trusted firmware on a host server is used for managing access to a hardware security module (HSM) connected to the host server. The HSM stores confidential information associated with an operating system. As part of access management, the firmware detects a boot device identifier associated with a boot device configured to boot the operating system on the host server. The firmware then receives a second boot device identifier from the HSM. The boot device identifier and the second boot device identifier are then compared by the firmware. Based on the comparison, the firmware determines that the boot device identifier matches with the second boot device identifier. Based on this determination, the firmware grants the operating system access to the HSM.

16 Claims, 10 Drawing Sheets

(51) Int. Cl.
*G06F 21/57* (2013.01)
*G06F 9/455* (2018.01)

(58) Field of Classification Search
USPC .......................................................... 726/34
See application file for complete search history.

(56) References Cited

U.S. PATENT DOCUMENTS

| | | | |
|---|---|---|---|
| 7,725,703 B2* | 5/2010 | Hunter | G06F 21/575 |
| | | | 380/259 |
| 8,626,891 B2 | 1/2014 | Guru et al. | |
| 9,756,022 B2 | 9/2017 | Amiri et al. | |
| 2006/0155988 A1* | 7/2006 | Hunter | G06F 21/575 |
| | | | 713/164 |
| 2011/0191599 A1 | 8/2011 | Chou et al. | |
| 2012/0265976 A1* | 10/2012 | Spiers | H04L 63/0218 |
| | | | 713/2 |
| 2012/0266252 A1* | 10/2012 | Spiers | H04L 63/0218 |
| | | | 726/26 |
| 2013/0179676 A1* | 7/2013 | Hamid | H04L 9/08 |
| | | | 713/150 |
| 2014/0331309 A1* | 11/2014 | Spiers | H04L 63/0218 |
| | | | 726/12 |
| 2015/0358294 A1 | 12/2015 | Kancharla et al. | |
| 2016/0092687 A1* | 3/2016 | Boenisch | G06F 9/4408 |
| | | | 713/2 |
| 2016/0155988 A1 | 6/2016 | Kuroki | |
| 2016/0246637 A1* | 8/2016 | Divakarla | G06F 9/45558 |

OTHER PUBLICATIONS

IBM, "List of IBM Patents or Patent Applications Treated as Related."

"Crypto Hypervisor: Cryptography as a Service | Encryption in the Cloud", SafeNet: The Data Protection Company, Belcamp, MD, Copyright 1983-2014 SafeNet, Inc., (Date Printed: Mar. 9, 2014). http://www.safenet-inc.com/data-protection/virtualization-cloud-security/crypto-hypervisor-cloud-encryption/.

"Securing Luna HSM Connections in Virtual Environments", Whitepaper, pp. 1-10, SafeNet: The Data Protection Company, © 2013 SafeNet, Inc.

Mell, P. et al, "The NIST Definition of Cloud Computing," Recommendations of the National Institute of Standards and Technology, U.S. Department of Commerce, NIST Special Publication 800-145, Sep. 2011.

* cited by examiner

HARDWARE SECURITY MODULE ACCESS MANAGEMENT IN A CLOUD COMPUTING ENVIRONMENT

BACKGROUND

The present disclosure relates to cloud computing environments, and more specifically, to managing access to confidential information stored on hardware security modules (HSM's) used in a cloud computing environment.

Hardware security modules (HSM's) are devices used to store confidential information including, for example, encryption keys (e.g., private keys, master keys, etc.). HSM's may be implemented using tamper-resistant hardware (e.g., crypto adapters). In some embodiments, HSM's may be crypto co-processors which are configured to store confidential information in a manner that prevents access to the confidential information. Moreover, such an HSM may be configured to block usage of the confidential information unless proper authentication is provided. For example, a user may not be able to use the keys stored in an HSM if it cannot prove that it has the right to do so. Further, in some embodiments, an HSM may be a hardware adapter or a partition within a self-virtualizing adapter (e.g., a cryptographic domain in a crypto adapter). Further, in some embodiments, an HSM may be a co-processor that is affixed to a computer's motherboard. In addition, a single co-processor may be partitioned, so as to enable it to maintain two or more separate HSM's at one time.

An HSM may provide conventional hardware security functions such as cryptographic functions including key generation, hashing, signing, verification, encryption, and decryption. These operations may be performed in conventional ways. For example, an HSM may employ the Rivest-Shamir-Adleman (RSA) algorithm for encryption/decryption and digital signature operations, and the Secure Hash Algorithm SHA-1 for hash operations.

In the context of cloud computing environments, HSM's may be used to maintain important customer secrets. Specifically, when a user associated with an HSM wants to access encrypted data from a cloud, a secure connection may first be established between the user's device (e.g., a client) and the user's assigned cloud-hosted HSM. Keys contained in the HSM may then be used to decrypt the user's data.

SUMMARY

According to embodiments of the present disclosure, aspects of the disclosure may include a method, a system, and a computer program product for managing access to a hardware security module (HSM) connected to a host server. The HSM may be used to store confidential information associated with an operating system. As part of the method, the system, or the computer program product, a boot device identifier associated with a boot device configured to boot the operating system on the host server may be detected. A second boot device identifier may then be received from the HSM. The boot device identifier and the second boot device identifier may then be compared. Based on the comparison, it may be determined that the boot device identifier matches with the second boot device identifier. Based on this determination, the operating system may then be granted access to the HSM.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
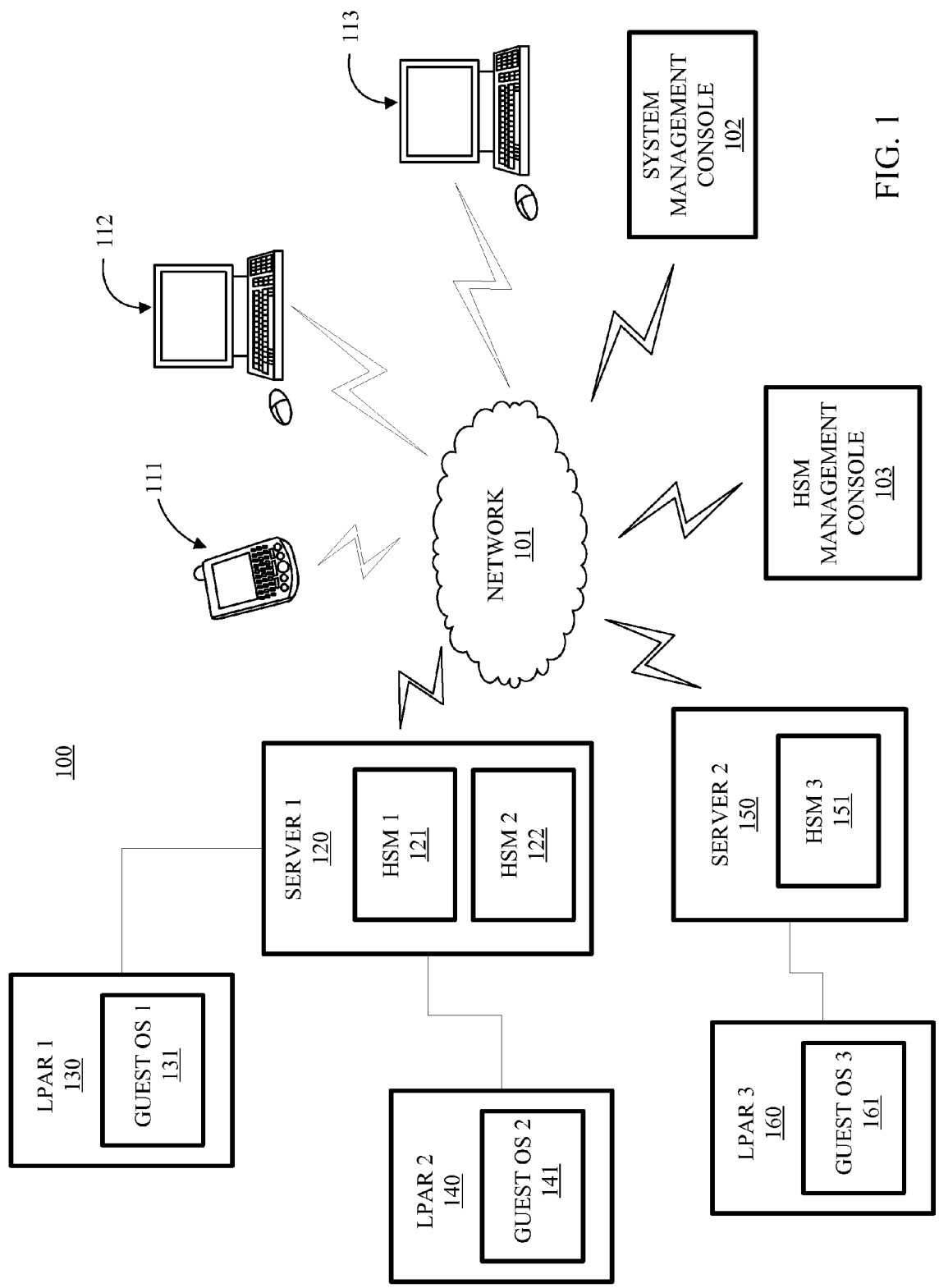
FIG. 1 illustrates a block diagram of an example cloud computing environment that may be configured to perform one or more of the methods described herein, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing access to confidential information stored on hardware security modules (HSM's) used in a cloud computing environment. While the present disclosure is not necessarily limited to such applications, and may be usable, for example, in non-cloud environments, various aspects of the disclosure may be appreciated through a discussion of various examples using this context.

The use of cloud computing environments may promote the sharing of resources. This may occur at least in part because in these environments many clients may share a large server or set of servers, rather than each client operating on its own server. This sharing of resources may, in turn, allow for more efficient resource allocation. Alongside this advantage, however, certain challenges must also be considered. Specifically, there is need in these environments to safely share hardware between tenants of the same servers, with HSM's being of particular importance, given their use in storing confidential information.

In some situations, the hardware components in a cloud computing environment may be arranged in such a manner that a single HSM could potentially be accessed by different users (e.g., separate customers having different logical partitions (LPAR's)). This could be an acceptable scenario, for example, where confidential information stored on an HSM is wiped clean before the HSM is reassigned from an old user to a new user. However, a misassignment may also be possible. For example, a system administrator may mistakenly reassign an HSM from one LPAR to another without removing the first user's keys from the HSM. In these situations, the security of an HSM may be at the discretion of a system administrator.

By taking certain steps, however, it may be possible to avoid these misassignments or at least to avoid a serious security breach if a misassignment does occur. For instance, it may be possible to store confidential information associated with an LPAR on an assigned HSM without relying on the system administrator. Instead, as discussed in more detail elsewhere herein, a separate HSM management console may be responsible for storing the confidential information properly on an HSM. Furthermore, the HSM management console may also store on the HSM information usable to identify the boot device configured to boot the guest operating system (guest OS) used to run the LPAR associated with that HSM. In some embodiments, firmware may later use this identity information (referred to herein as a boot device identifier) by comparing it with a boot device identifier taken from the specific boot device used to boot an LPAR. If the boot device identifiers match, then the LPAR is determined to be the one properly associated with the HSM and is allowed to access the HSM (and potentially the full functionality associated therewith). If, however, the boot device identifiers do not match, then the LPAR is denied access to the HSM and the confidential information stored thereon. Additionally, the firmware may notify certain relevant parties about the denied access (the system administrator, the HSM owner, etc.). In some situations, these steps may prevent an LPAR from obtaining improper access to a misassigned HSM. Furthermore, in some situations, these steps may allow for managing secure access to an HSM without using signed message protocols or at least without using repeated signed message protocols for each access request (which may, in turn, mean less overhead for each access request).

Turning now to the figures, FIG. 1 depicts a block diagram of cloud computing environment 100 that may be configured to perform one or more of the methods described herein, in accordance with embodiments of the present disclosure. As described in more detail elsewhere herein, a cloud computing environment may include a network-based, distributed data processing system that provides one or more cloud computing services. In some embodiments, elements within cloud computing environment 100 may be connected via network 101. This network 101 may be implemented by any number of any suitable communications media (e.g., wide area network (WAN), local area network (LAN), Internet, Intranet). The elements distributed about the cloud computing environment 100 may include a system management console 102; an HSM management console 103; servers 120 and 150; and clients 111, 112, and 113. System management console 102 may include one or more computers including software configured to manage the use of the servers 120 and 150. In some embodiments, as described in more detail elsewhere herein, system management console 101 may be operated by a system administrator responsible for overseeing cloud computing environment 100. Also as described in more detail elsewhere herein, the HSM management console 103 may include one or more computers adapted for configuring HSM's once they are assigned to specific guest operating systems (guest OS's).

Servers within cloud computing environment 100 may host logical partitions (LPAR's) including, for example, virtual machines. In the illustrated embodiment, server 120 hosts LPAR's 130 and 140 and server 150 hosts LPAR 160. These servers may be housed at the same location or may be geographically remote from each other. Server 120 and 150 may communicate with each other and with other elements of the cloud computing environment 100 (e.g., system management console 102) through the network 101. Each of the LPAR's 130, 140, and 160 may be associated with a guest OS 131, 141, and 161, respectively, which may, likewise, be associated with (e.g., bound to) an HSM 121, 122, and 151, respectively. The binding of HSM's to guest OS's is discussed elsewhere herein. Within each LPAR, workloads (e.g., applications or programs) may be run using the respective guest OS. In some embodiments, LPAR's 130, 140, and 160 may have differing sets of resource requirements, for example, where they are running different applications or applications of varying types (e.g., databases, word processing programs, gaming software, etc.). Further in some embodiments, each guest OS may be associated with one or more boot devices. As used herein, a boot device may refer to a device that is usable to start a guest OS. The server may load the guest OS from the boot device into the memory of the server on which the guest OS is hosted. Examples of boot devices include boot disks or boot drives (e.g., on a hard drive or virtual hard drive). Also, boot chips may be used by some network computers that receive a guest OS over a network.

Clients within the cloud computing environment 100 may be computers used to display LPAR's to their users (e.g., customers or tenants). Specifically, clients 111, 112, and 113 may be associated with LPAR's 130, 140, and 160, respectively. Clients 111, 112, and 113 may be any relevant computer system or combination of computer systems including, for example, desktops, laptops, mobile phones, smart phones, tablets, personal or enterprise digital assistants, and the like. In some embodiments, multiple clients may share one or more LPAR's.

While two servers, three LPAR's, and three clients are shown for illustrative purposes in FIG. 1, it is contemplated that dozens, hundreds, or any number of servers and associated LPAR's and clients may be used in some embodiments. Further, in some embodiments, multiple LPAR's may be hosted on each server, for example, there may be a ratio of about 10 to 1, LPAR's to host severs, in the cloud computing environment 100.

Figure 2:
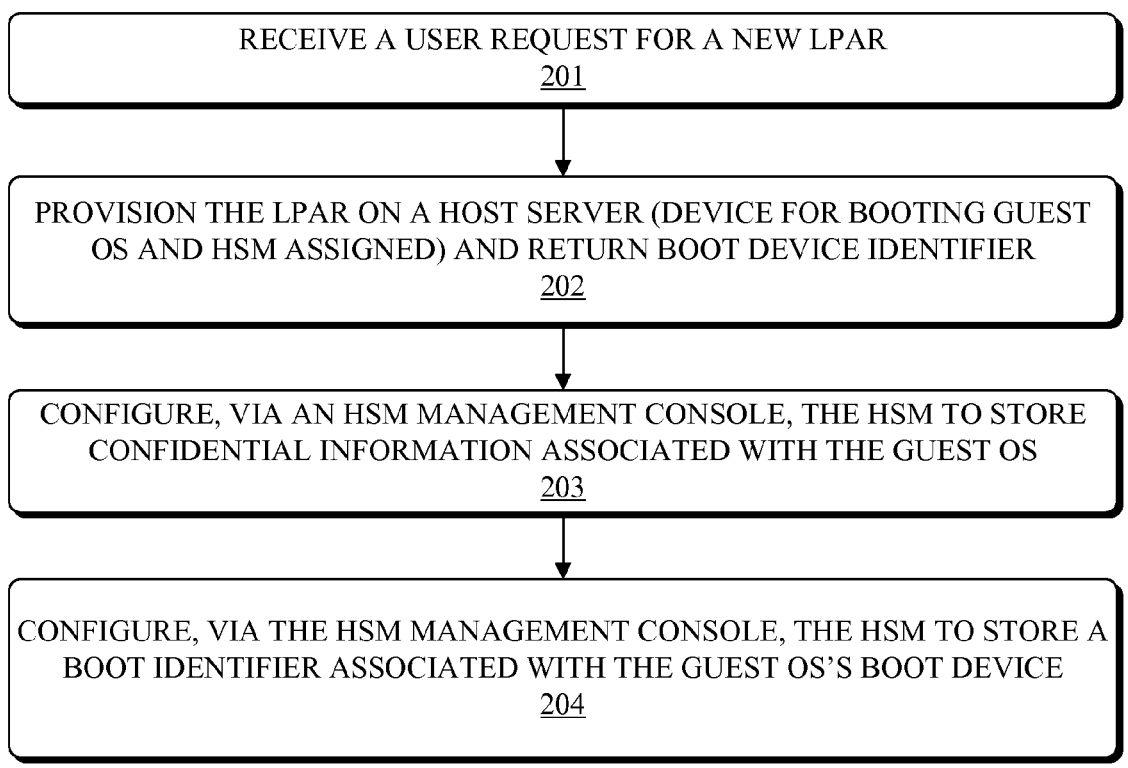
FIG. 2 illustrates a flowchart of an example method for setting up new user-requested logical partitions (LPAR's) within a cloud computing environment, in accordance with embodiments of the present disclosure.

Turning now to FIG. 2, depicted is a flowchart of a method 200 for setting up new user-requested LPAR's within a cloud computing environment (e.g., cloud computing environment 100 of FIG. 1), in accordance with embodiments of the present disclosure. The method 200 may begin at block 201, where a user request for a new LPAR is received. The request may be sent from a remote client belonging to the user and may be received, for example, by a system management console. In some embodiments, the user may be an individual or an organization that wishes to become a tenant within a cloud computing environment that is owned or operated by a third party provider. Further, in some embodiments, the user may be an employee of an organization that owns or rents one or more of the servers of the cloud computing environment. In the latter situation, the cloud computing environment may be a private cloud.

Next, per block 202, an entity (e.g., the system administrator using the system management console) may provision a new LPAR on a host server, for example, server 120 of FIG. 1, in response to the user request. As part of the provisioning, a device for booting a guest OS (used to run applications on the new LPAR) and an HSM may be assigned to the user and a boot device identifier may be returned (e.g., to the user). In some embodiments, the system management console may be a client that is adapted for assigning components to LPAR's within a cloud computing environment. It may effectively define which LPAR may use which HSM on a given server or set of servers. In some embodiments, the HSM may be bound to its associated guest OS when the system management console copies an operating system image of the guest OS into the boot device.

Per block 203, the assigned HSM may be configured to store confidential information associated with the guest OS. This configuring may be performed using an HSM management console, for example, HSM management console 103 of FIG. 1. As used herein, an HSM management console may refer to a device that is adapted to configure the state of an HSM through a secure communication channel. The HSM management console may be used to load the confidential information onto the HSM. This stored confidential information may include a variety of private information associated with a guest OS (e.g., private information that is specific to the user of the guest OS). Examples of confidential information include keys (e.g., cryptographic master keys) and other customer secrets. In some embodiments, the confidential information may be installed into the HSM by a trusted third party (e.g., a certifying authority) and, as part of the installation, the confidential information may be configured by the user (e.g., customer) so as to maintain the confidential information in a manner that keeps it secret from the system administrator (e.g., the system management console). An example HSM management console may include a trusted key entry console.

It is contemplated that in some embodiments, the confidential information may be stored in a protected area of the HSM that is inaccessible even to trusted elements of the cloud computing environment (e.g., the system management console), and it may only be usable by specific trusted entities under specific circumstances. In some embodiments, this confidential information may be usable only upon proper user authentication. This may help to ensure that keys are kept in the control of the proper user.

Per block 204, the HSM management console may also configure the HSM to store a boot device identifier associated with the guest OS's boot device, or, in some situations, recognize a boot device identifier that was previously stored on the HSM. As used herein, a boot device identifier may refer to any piece of information or data associated with a particular boot device that can be used to identify that boot device. Example boot device identifiers may include, for example, portions of the data that make up the boot device. It is further contemplated that, in some embodiments, a boot device identifier may comprise a digital hash of data on the boot device (e.g., a hash value).

Figure 3:
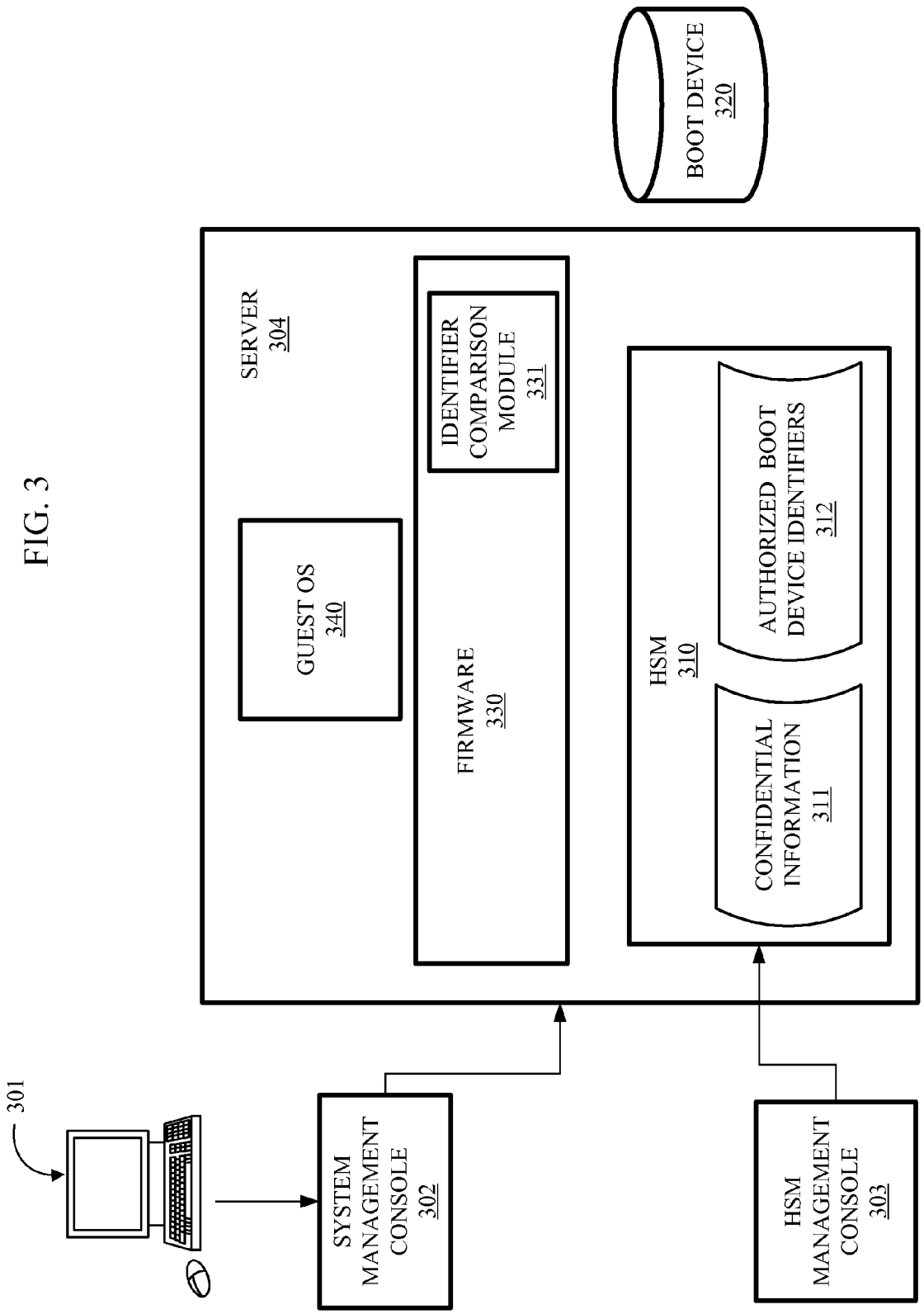
FIG. 3 illustrates a portion of an example cloud computing environment being used to set up a new LPAR, in accordance with embodiments of the present disclosure.

Turning now to FIG. 3, depicted is a portion of a cloud computing environment being used to set up a new LPAR, in accordance with embodiments of the present disclosure. In this example, a user may communicate, through a client 301, with a system management console 302. The communication may include a request to establish a new LPAR in the cloud computing environment. The system management console 302 may then designate a server 304 to host the new LPAR. Based on the instructions received by the server 304, a guest OS 340 may be established within the server and assigned to the client 301. Likewise, an HSM 310 may also be assigned to the client 301. The guest OS 340 may be adapted to run on firmware 330 and may also be associated with a boot device 320. The HSM 310 may be bound to the guest OS 340 when the system image of the guest OS 340 is copied onto the internal memory of the HSM 310.

Also depicted in FIG. 3, as part of the configuration of the HSM 310, a secure channel may be used to store (on the HSM 310) confidential information 311 associated with the guest OS 340 (e.g., master keys owned by the user of client 301). To copy this confidential information, a connection may be established directly between the HSM management console 303 and the client 301. Once stored, access to the confidential information 311 may be restricted. For example, confidential information 311 may not be accessible by firmware 330 or system management console 302. Also as part of the configuration, the HSM management console 303 may store (on the HSM 310) authorized boot device identifiers 312, which are associated with boot devices that are used to boot guest OS's authorized to access the HSM 310 in order to utilize confidential information 311. In an example, the authorized boot device identifier 312 may be a copy of a boot device identifier that is part of boot device 320, which is itself the boot device associated with the guest OS 340.

Figure 4:
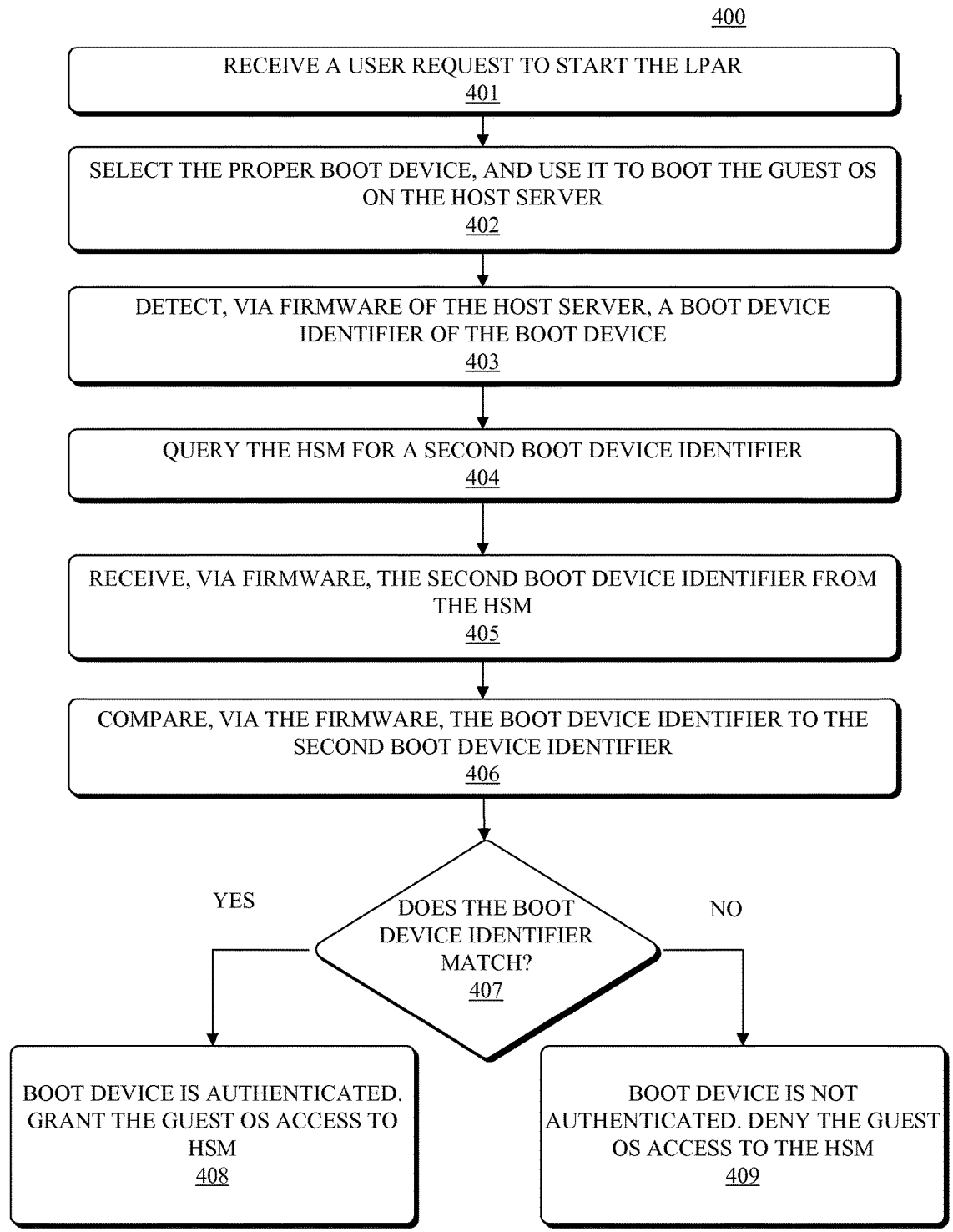
FIG. 4 illustrates a flowchart of an example method for managing access to an HSM in a cloud computing environment, in accordance with embodiments of the present disclosure.

Turning now to FIG. 4, depicted is a flowchart of a method 400 for managing access to an HSM in a cloud computing environment, in accordance with embodiments of the present disclosure. In some embodiments, method 400 may be performed in conjunction with (e.g., subsequent to) method 200 of FIG. 2. For example, an HSM used in method 400 may have previously been configured using method 200. The method 400 may begin at block 401 with a user request to start the LPAR associated with the user. The server previously designated to host the LPAR may then, per block 402, select the proper boot device associated with the LPAR (e.g., the boot device associated with the guest OS upon which the LPAR operates). The boot device may be used to boot the guest OS on the host server.

Per block 403, firmware of the host server may detect the boot device identifier of the boot device. In some embodiments, the firmware may be trusted firmware that is configured to prevent tampering by customers (e.g., users). Tampering prevention may be implemented, for example, using hardware of the host server and may be verifiable using specific technologies (e.g., trusted platform modules). Per block 404, the firmware of the host server may also query the HSM for boot device identifiers associated with one or more guest OS's that are permitted to access the confidential information stored on the HSM. In response to the query, the firmware may receive, per block 405, a second boot device identifier associated with the boot device that is configured to boot the guest OS associated with the HSM.

Per block 406, once the firmware has both the boot device identifier from the boot device and the second boot device identifier from the HSM, the identifiers are compared. In some embodiments, this comparison may be made by an identifier comparison module within the firmware. Per decision block 407, a determination may be made as to whether the identifiers match. If the identifiers do match, then, per block 408, the boot device is authenticated, and the booted guest OS is granted access to the HSM (e.g., allowed to utilize the confidential information stored thereon). If, however, per block 409, the identifiers do not match, then the boot device is not authenticated, and the booted guest OS is denied access to the HSM. Additionally, in some embodiments, the system may notify the system administrator or HSM owner (e.g., the user associated with the guest OS) about the denied access.

In some embodiments, it is contemplated that the second boot device identifier stored on the HSM may be stored in the form of a hash value. In such embodiments, the boot device identifier detected on the boot device itself may first be hashed prior to being compared with the hashed copy from the HSM. This use of hash values may aid in determining whether tampering has taken place. Further, in some embodiments, a boot device identifier may not be identical to a matching second boot device identifier and, instead, they may be deemed matching because they are recognized as being identifiers for the same boot device.

Many other variations on method 400 are also contemplated. For example, in some embodiments, the firmware may query more than one HSM in an attempt to determine which of several HSM's is the one or more HSM's associated with the guest OS that is being booted. In such embodiments, the firmware may review several boot device identifiers received from the several HSM's in order to determine the proper HSM (e.g., the HSM that the guest OS has the right to access). For each HSM that does not have a boot device identifier matching the boot device of the guest OS, the guest OS is denied access to that HSM.

In addition, while firmware is described as being used in many of the blocks of the method 400, in another variation on the method it is contemplated that in some embodiments one or more of these steps may be performed by other devices. Specifically, in some embodiments, these steps may be performed by a hypervisor. As used herein, a hypervisor may refer to firmware or software which runs on a server and is configured to control and manage resource allocations for LPAR's hosted on the server.

In addition, while some embodiments of method 400 may be described as occurring during a boot of an operating system, it is contemplated that in some embodiments variants on method 400 may be performed at other times. For example, firmware may use steps of the method 400 to allow access to an HSM by an instance of an operating system that had been running on the host server for a substantial time prior to needing (or requesting) to access the HSM.

Figure 5:
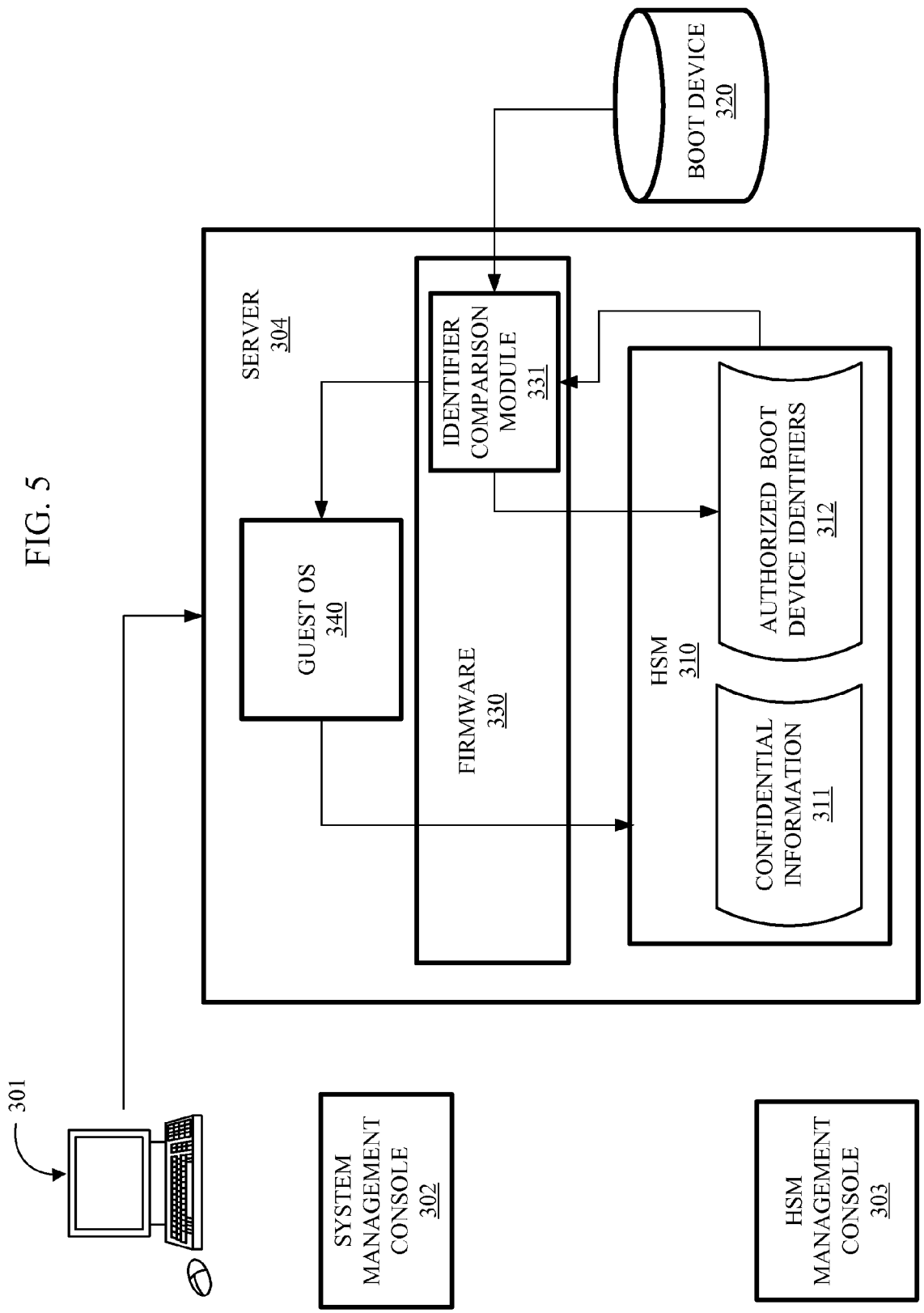
FIG. 5 illustrates the same portion of an example cloud computing environment depicted in FIG. 3, this time being used to manage access to a previously assigned and configured HSM, in accordance with embodiments of the present disclosure.

Turning now to FIG. 5, depicted is the same portion of a cloud computing environment depicted in FIG. 3, this time being used to manage access to the previously assigned and configured HSM, in accordance with embodiments of the present disclosure. In this example, the user of client 301 sends a request to the host server 304 to start its LPAR (e.g., the LPAR associated with guest OS 340). The firmware 330 of the server 340 may detect the boot device identifier of the boot device 320 used to boot the guest OS 340. The firmware 330 may also query the HSM 310. In response to the query, the HSM 310 may transmit to the firmware 330 one or more authorized boot device identifiers 312. The identifier comparison module 331 may then compare the boot device identifier detected on the boot device 320 with the authorized boot device identifier 312. Upon determining that the identifiers correspond (e.g., match), the firmware 330 may then grant the guest OS 340 the right to access the HSM 310 in order to use confidential information 311 stored thereon.

Figure 6:
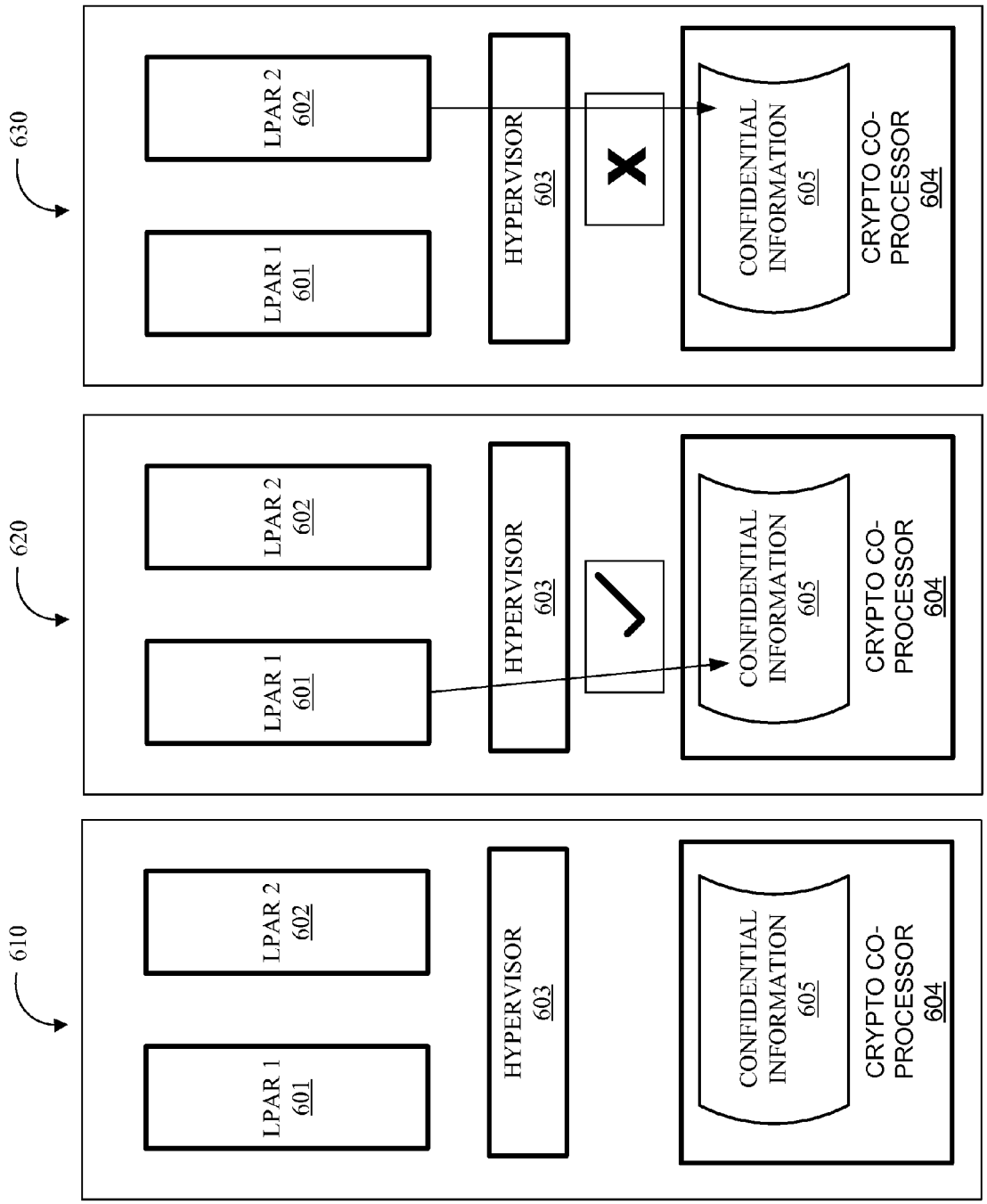
FIG. 6 illustrates three diagrams of an example system wherein a hypervisor is being used to manage access to a crypto co-processor, in accordance with embodiments of the present disclosure.

Turning now to FIG. 6, depicted are three diagrams 610, 620, 630 of a system (e.g., the same system shown at three different times), wherein a hypervisor is being used to manage access to a crypto co-processor, in accordance with embodiments of the present disclosure. The example system is first shown in block 610. As depicted, this system may include two LPAR's 601 and 602 that are managed by a hypervisor 603. An included crypto co-processor 604 may be used to store confidential information 605. In block 620, the LPAR 601 may attempt to access the confidential information 605. By using one or more steps of one or more of the methods described herein (e.g., method 400 of FIG. 4), the hypervisor 603 may be able to compare the boot device identifier of the boot device of the guest OS associated with LPAR 601 with the second boot device identifier stored on the crypto co-processor 604. Because the first and second boot device identifiers match, the hypervisor 603 may grant LPAR 601 access to the confidential information 605.

In block 630, the other LPAR (i.e., LPAR 602) may attempt to access the confidential information 605. Repeating the steps described in reference to block 620, the hypervisor 603 may compare the third boot device identifier associated with LPAR 602 with the second boot identifier stored on the crypto co-processor 604. Upon finding that the second and third identifiers do not match, the hypervisor 603 may deny LPAR 602 access to the confidential information 605.

It is contemplated that the scenarios described in reference to FIG. 6 may occur in a variety of situations. For example, one or more of these scenarios could occur where the crypto co-processor 604 comprises a shared HSM (e.g., an HSM that may be configurable to be used with different LPAR's, for example, at different times). For example, in such a scenario, the crypto co-processor 604 may first be configured to store keys (e.g., as part of confidential information 605) associated with LPAR 601. Later, the user of LPAR 601 may discontinue use of the cloud computing environment (e.g., where the user is a customer who decides to move to a different cloud). After that user has left, the system management console may reassign the crypto co-processor 604 to a new user (e.g., the user associated with LPAR 602). In this example, due to a breach in protocol, the reassignment may occur without first properly erasing the confidential information 605. This breach in protocol could potentially lead to the user of LPAR 602 gaining improper access to the keys belonging to the user of LPAR 601. However, the breach may still be prevented because hypervisor 603 is able to use the methods described herein to block the access of LPAR 602 to the crypto co-processor 604.

Figure 7:
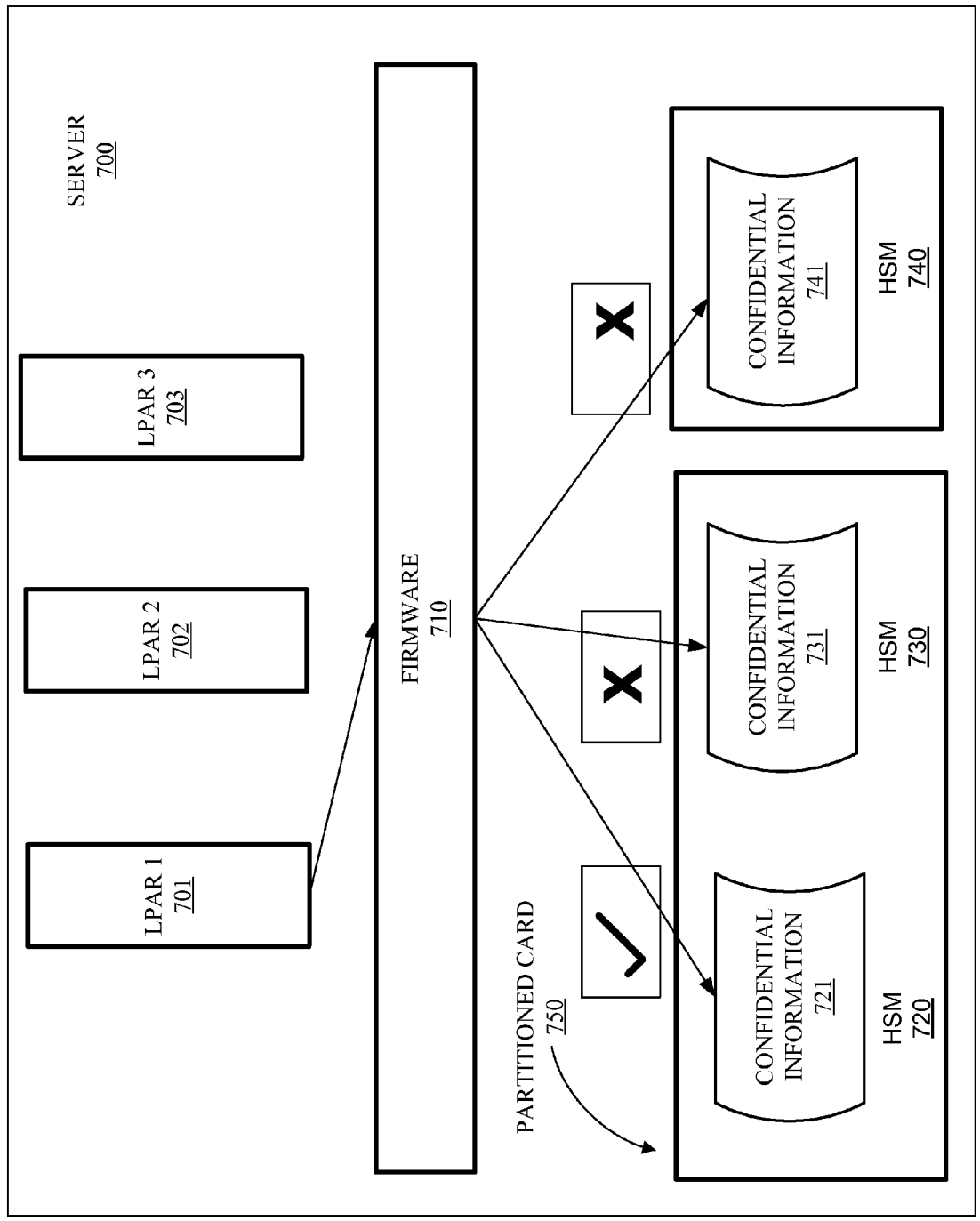
FIG. 7 illustrates an example of firmware being used to manage access to multiple HSM's in a single server of a cloud computing environment, in accordance with embodiments of the present disclosure.

Turning now to FIG. 7, depicted is an example of firmware being used to manage access to multiple HSM's in a single server 700 of a cloud computing environment, in accordance with embodiments of the present disclosure. As illustrated, the server 700 includes three LPAR's 701, 702, and 703 running on firmware 710. Also included within the server 700 are three HSM's 720, 730, and 740, which store confidential information 721, 731, and 741, respectively. It is noted that, in this example, HSM's 720 and 730 are arranged on different portions of a partitioned card 750, while HSM 740 is located elsewhere. It is contemplated that the use of partitioned cards may be used in some other embodiments as well.

In this example, the firmware 710 may need to determine which of the HSM's is associated with the LPAR 701 after it is booted. To accomplish this, the firmware 710 may query all three of the HSM's 720, 730, and 740, to determine which boot device identifiers are stored within which HSM. The firmware 710 may compare the boot device identifiers received from the HSM's with the boot device identifier of the boot device used to boot LPAR 701. Based on this comparison, the firmware 710 may determine that only HSM 720 is bound to LPAR 701 and, accordingly, the firmware 710 may only allow the LPAR 701 access to HSM 720 (and not allow it access to HSM 730 or 740).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. In particular, it is contemplated that in some embodiments the methods described herein may be used for managing access to HSM's by operating systems that are not guest operating systems. Furthermore, firmware may use teachings described herein to manage access to HSM's in local computing or non-network based environments (e.g., for managing key usage by an operating system on a conventional desktop computer).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
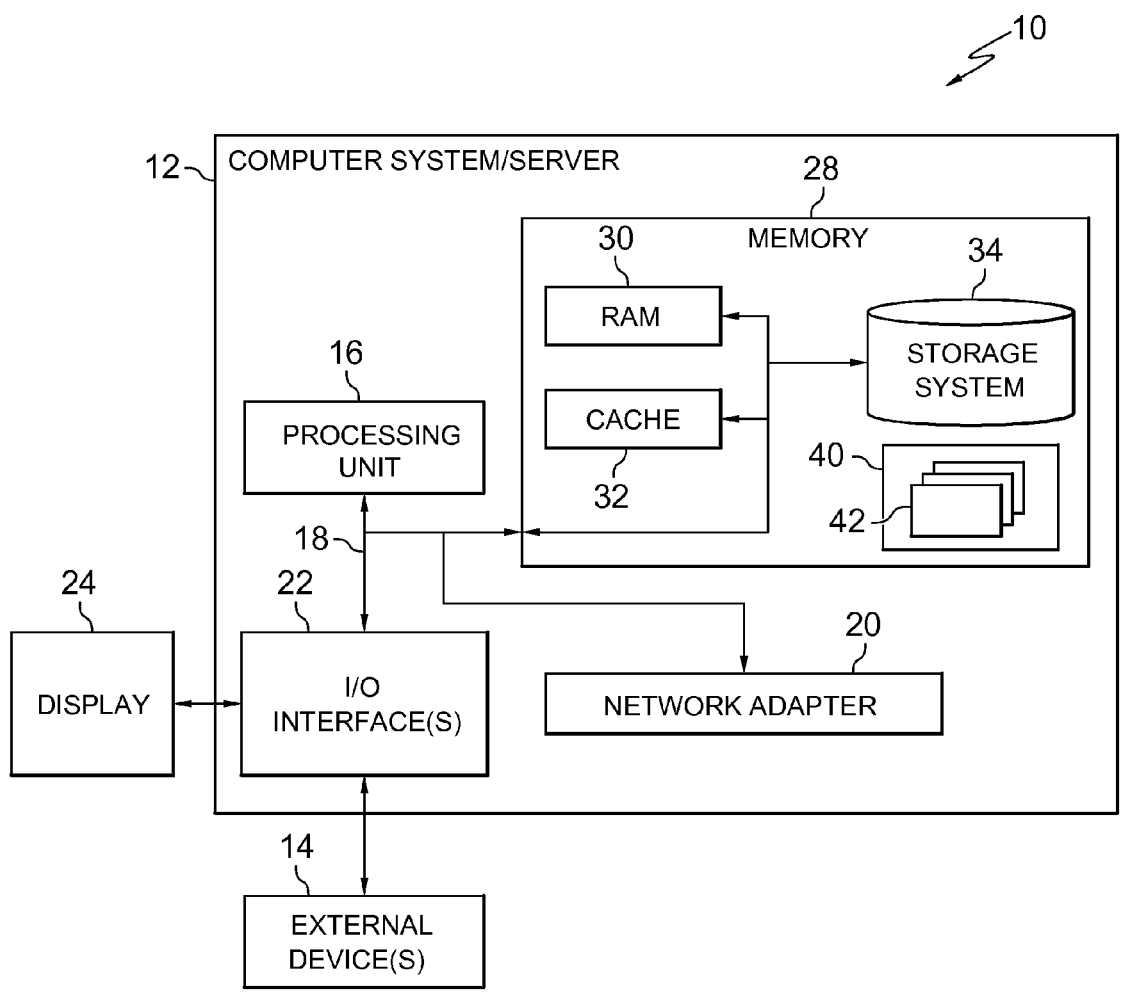
FIG. 8 illustrates a diagram of an example cloud computing node, in accordance with embodiments of the present disclosure.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
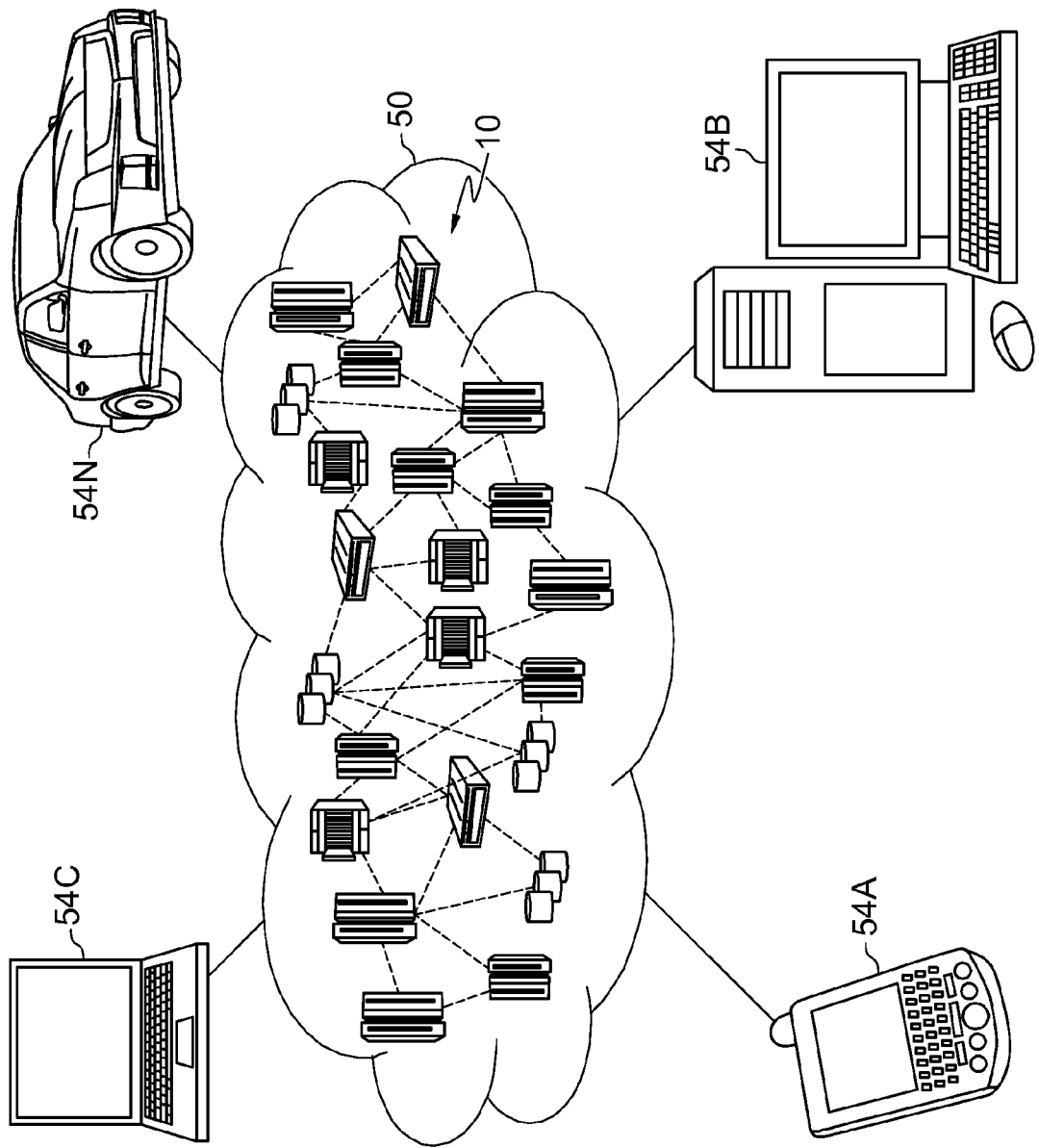
FIG. 9 illustrates a diagram of an example cloud computing environment, in accordance with embodiments of the present disclosure.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
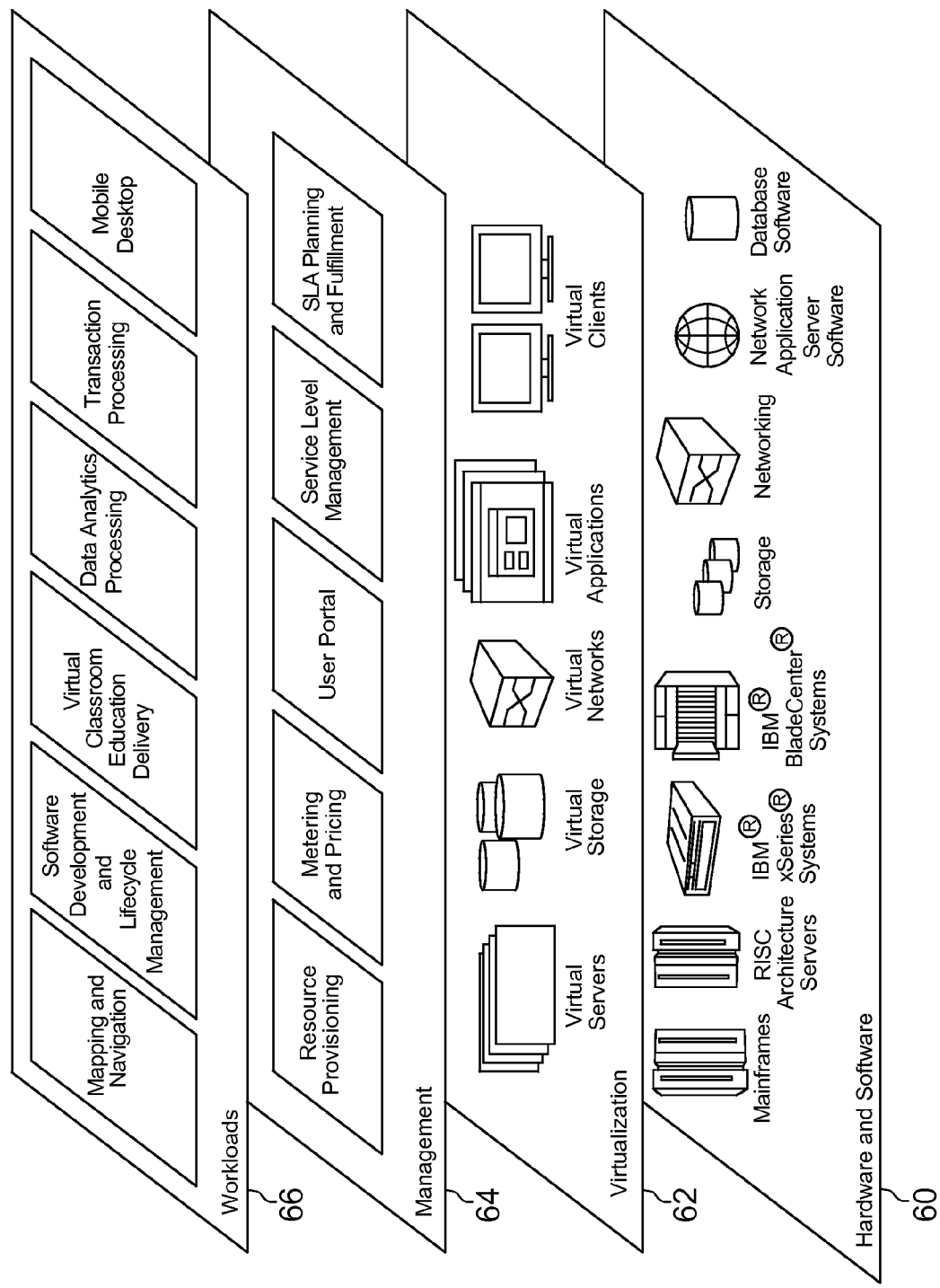
FIG. 10 illustrates a diagram of example abstraction model layers, in accordance with embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). In some embodiments, additional hardware components include HSM's discussed elsewhere herein.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for managing access to a hardware security module (HSM) connected to a host server, the HSM having confidential information associated with an operating system stored thereon, the computer program product comprising a non-transitory computer-readable storage medium having program instructions embodied therewith, the program instructions executable by a computer to cause the computer to:
  detect a boot device identifier associated with a boot device configured to boot the operating system on the host server;
  receive a second boot device identifier from the HSM;
  compare the boot device identifier to the second boot device identifier;
  determine, based on the comparing, that the boot device identifier matches with the second boot device identifier; and
  grant, subsequent to the determining, the operating system access to the HSM.

2. The computer program product of claim 1, wherein the program instructions are executable by the computer to further cause the computer to:
  detect a third boot device identifier associated with a second boot device configured to boot a second operating system on the host server;
  compare the second boot device identifier to the third boot device identifier;
  determine, based on the comparing the second boot device identifier to the third boot device identifier, that the second boot device identifier does not match with the third boot device identifier; and
  deny, subsequent to the determining that the second boot device identifier does not match with the third boot device identifier, the second operating system access to the HSM.

3. The computer program product of claim 2, wherein the program instructions are executable by the computer to further cause the computer to:
  receive a fourth boot device identifier from a second HSM connected to the host server, the second HSM having second confidential information associated with the second operating system stored thereon;
  compare the third boot device identifier to the fourth boot device identifier;
  determine, based on the comparing the third boot device identifier to the fourth boot device identifier, that the third boot device identifier matches with the fourth boot device identifier; and
  grant, subsequent to the determining that the third boot device identifier matches with the fourth boot device identifier, the second operating system access to the second HSM.

4. The computer program product of claim 3, wherein the HSM and the second HSM are contained on a single card as partitioned portions.

5. The computer program product of claim 1, wherein the operating system is an instance i of a guest operating system running on the host server, and wherein the program instructions are executable by the computer to further cause the computer to:
  boot, prior to the detecting, the guest operating system on the host server using the boot device.

6. A system for managing access to a hardware security module (HSM) connected to a host server, the HSM having confidential information associated with an operating system stored thereon, the system comprising one or more circuits configured to perform a method comprising:
  detecting a boot device identifier associated with a boot device configured to boot the operating system on the host server;
  receiving a second boot device identifier from the HSM;
  comparing the boot device identifier to the second boot device identifier;
  determining, based on the comparing, that the boot device identifier matches with the second boot device identifier; and
  granting, subsequent to the determining, the operating system access to the HSM.

7. The system of claim 6, wherein the one or more circuits are further configured to perform the method comprising:
  detecting a third boot device identifier associated with a second boot device configured to boot a second operating system on the host server;
  comparing the second boot device identifier to the third boot device identifier;
  determining, based on the comparing the second boot device identifier to the third boot device identifier, that the second boot device identifier does not match with the third boot device identifier; and
  denying, subsequent to the determining that the second boot device identifier does not match with the third boot device identifier, the second operating system access to the HSM.

8. The system of claim 7, wherein the one or more circuits are further configured to perform the method comprising:

receiving a fourth boot device identifier from a second HSM connected to the host server, the second HSM having second confidential information associated with the second operating system stored thereon;

comparing the third boot device identifier to the fourth boot device identifier;

determining, based on the comparing the third boot device identifier to the fourth boot device identifier, that the third boot device identifier matches with the fourth boot device identifier; and granting, subsequent to the determining that the third boot device identifier matches with the fourth boot device identifier, the second operating system access to the second HSM.

9. The system of claim 6, wherein the operating system is an instance of a guest operating system running on the host server, and wherein the one or more circuits are further configured to perform the method further comprising:

booting, prior to the detecting, the guest operating system on the host server using the boot device.

10. The system of claim 6, wherein the comparing is performed by a device selected from the group consisting of firmware running on the host server and a hypervisor.

11. The system of claim 8, wherein the HSM and the second HSM are contained on a single card as partitioned portions.

12. The system of claim 6, wherein the one or more circuits are further configured to perform the method further comprising:

storing the confidential information combined with the second boot device identifier on the HSM via a secure protocol.

13. The system of claim 6, wherein the second boot device identifier is in the form of a hash value of data stored on the boot device.

14. The system of claim 6, wherein the HSM comprises an adapter card with a crypto co-processor.

15. The system of claim 6, wherein the operating system is a guest operating system.

16. The system of claim 6, wherein the second boot device identifier is a copy of the boot device identifier.

* * * * *